United States Patent [19]

Murakami

[11] 4,404,600
[45] Sep. 13, 1983

[54] GHOST SIGNAL CANCELLING APPARATUS

[75] Inventor: Junzo Murakami, Kawasaki, Japan

[73] Assignee: Tokyo Shibaura Denki Kabushiki Kaisha, Kawasaki, Japan

[21] Appl. No.: 412,874

[22] Filed: Aug. 30, 1982

Related U.S. Application Data

[63] Continuation of Ser. No. 12,485, Feb. 15, 1979, abandoned.

[30] Foreign Application Priority Data

Feb. 16, 1978 [JP] Japan ............................ 53-16825

[51] Int. Cl.³ .......................... H04N 5/21; H04B 1/10
[52] U.S. Cl. ................................... 358/905; 358/167; 333/18; 375/34; 455/296
[58] Field of Search ................. 358/905, 167, 36, 166, 358/37; 328/162, 165; 375/11, 12, 14, 34, 101, 103; 333/17, 18; 364/724; 455/63, 295, 296, 317, 307

[56] References Cited

U.S. PATENT DOCUMENTS

| | | | |
|---|---|---|---|
| 3,775,685 | 11/1973 | Eggimann | 375/12 |
| 3,825,680 | 7/1974 | Verhoeven | 358/167 |
| 3,949,162 | 4/1976 | Malueg | 358/167 |
| 3,956,583 | 5/1976 | Butler | 358/905 |
| 4,127,874 | 11/1978 | Iwasawa | 358/905 |
| 4,145,721 | 3/1979 | Beaudouin | 358/167 |
| 4,152,657 | 5/1979 | Robers | 358/905 |

OTHER PUBLICATIONS

CCD Delay Line is Exorcising TV Ghosts, Electronics International, Electronics, Aug. 4, 1977, vol. 50, No. 16 pp. 2-E-3-E.
A Fully Automatic Ghost Canceller, by Murakami, IEEE Transaction on Consumer Electronics, vol. CE-24, No. 3, Aug. 1978, pp. 267-271.
An Adaptive Equalizer for TV Channels, IEEE Transactions on Communication Technology, By Arnon, vol. Com-17, No. 6, Dec. 1969, pp. 726-734.
Performance of Jointly Optimized Prefilter-Equalizer Receivers, by J. W. Mark, IEEE Transactions on Communications, Aug. 1973, pp. 941-945.
An Input-Weighted CCD Transversal Filter, by Sakaue, Japanese Journal of Applied Physics, vol. 16, 1977, pp. 391-396.
An Automatic Equalizer for General Purpose Communication Channels, by Lucky, The Bell System Technical Journal, vol. 46, No. 9, Nov. 1967, pp. 2179-2208.

Primary Examiner—Tommy P. Chin
Attorney, Agent, or Firm—Olbon, Fisher, Spivak, McClelland & Maier

[57] ABSTRACT

The input video signal including a ghost signal is supplied to a first transversal filter weighted by a first weighting signal. The output of the first transversal filter is supplied to a difference circuit to detect the ghost signal component which is supplied to a second transversal filter weighted by the second weighting signal derived from the input video signal. The output of the second transversal filter is supplied to a circuitry which includes a sign detecting circuit and a tap gain memory to produce the first weighting signal.

16 Claims, 8 Drawing Figures

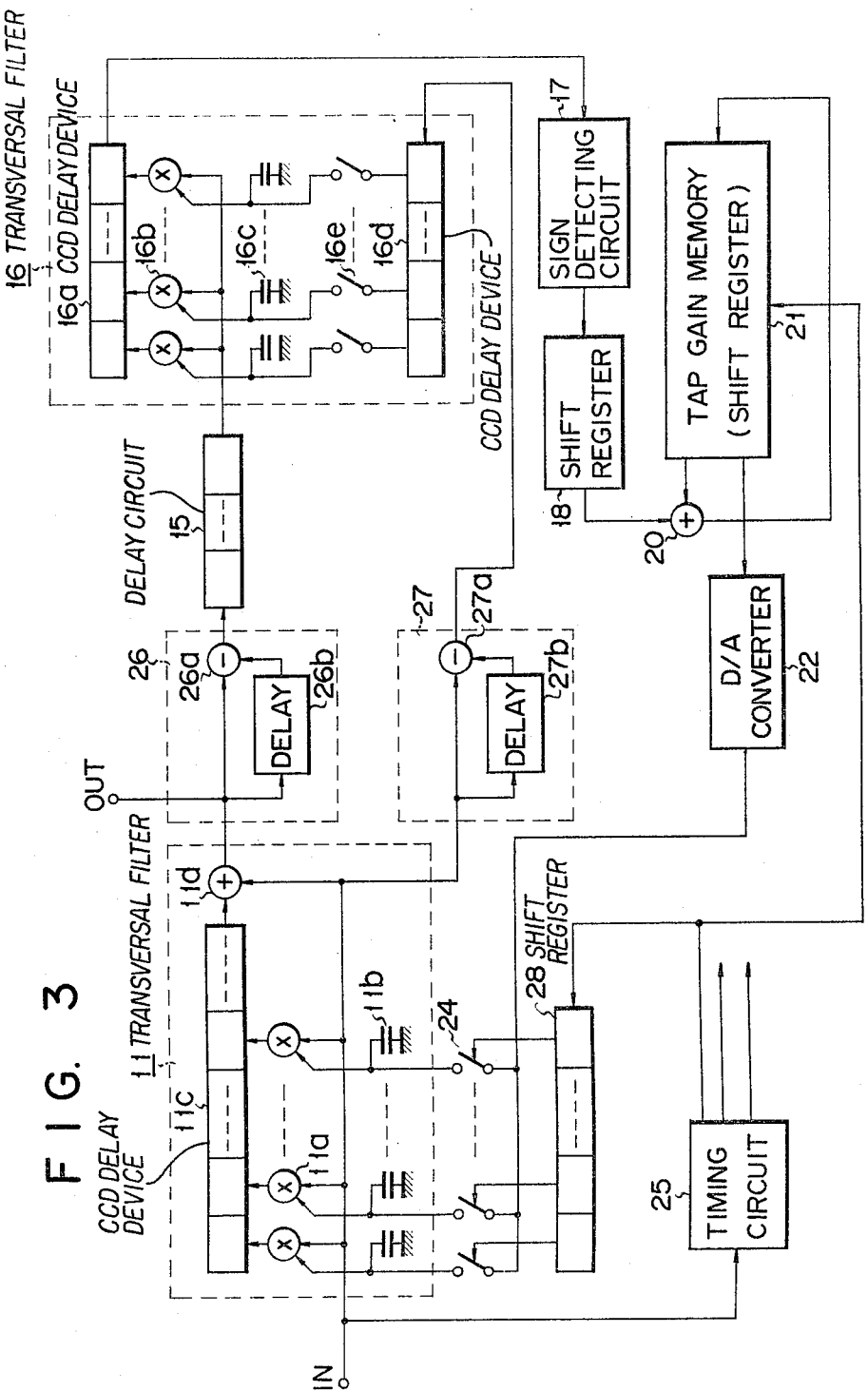
F I G. 3

GHOST SIGNAL CANCELLING APPARATUS

This is a continuation of application Ser. No. 012,485, filed Feb. 15, 1979, now abandoned.

This invention relates to an apparatus for cancelling ghost signals caused by electromagnetic waves which are reflected by mountains or buildings before reaching a receiving antenna overlapping on the electromagnetic waves which reach the receiving antenna directly from a transmitting antenna.

Signals which form a ghost image on the TV screen are generally called "ghost signals". Ghost signals are derived from electromagnetic waves which are reflected by mountains or buildings before reaching a receiving antenna. Signals derived from FM radio waves which are reflected by mountains or buildings before reaching a receiving antenna are known as "reflected wave signals", which will degrade the quality of the reproduced sound. This invention may of course be applied to cancel these FM radio reflected wave signals as well as TV ghost signals, but here it will be described how to cancel TV ghost signals according to this invention.

Various apparatus for removing ghost signals have been invented. However, they have a complicated circuit structure because the level of ghost signals and delay with respect to the main signal change along with a lapse of time or according to TV channels. Consequently they are so costly and so difficult to operate that they cannot be suitably used in ordinary household TV sets.

Accordingly, it is an object of this invention to provide an apparatus which has a simple circuit structure, can be manufactured at a low cost and is so easy to operate that it may be used suitably in household TV sets and which can yet cancel ghost signals effectively.

According to this invention, there is provided a ghost signal cancelling apparatus which comprises means for applying the input video signal to a filter circuit including a first transversal filter weighted with a first weighting signal, means for supplying the output signal from the filter circuit to a second transversal filter weighted with a signal derived from the input video signal, and means for producing said first weighting signal from the output signal from the second transversal filter.

Further, according to this invention there is provided a ghost signal cancelling apparatus which comprises means for applying the input video signal to a filter circuit including a first transversal filter weighted with a first weighting signal, means for supplying the input video signal to a second transversal filter weighted with a signal derived from the output signal from the filter circuit, and means for producing said first weighting signal from the output signal from the second transversal filter.

This invention can be more fully understood from the following detailed description when taken in conjunction with the accompanying drawings, in which:

FIG. 3 is a block circuit diagram showing another embodiment of this invention;

Figure 1:
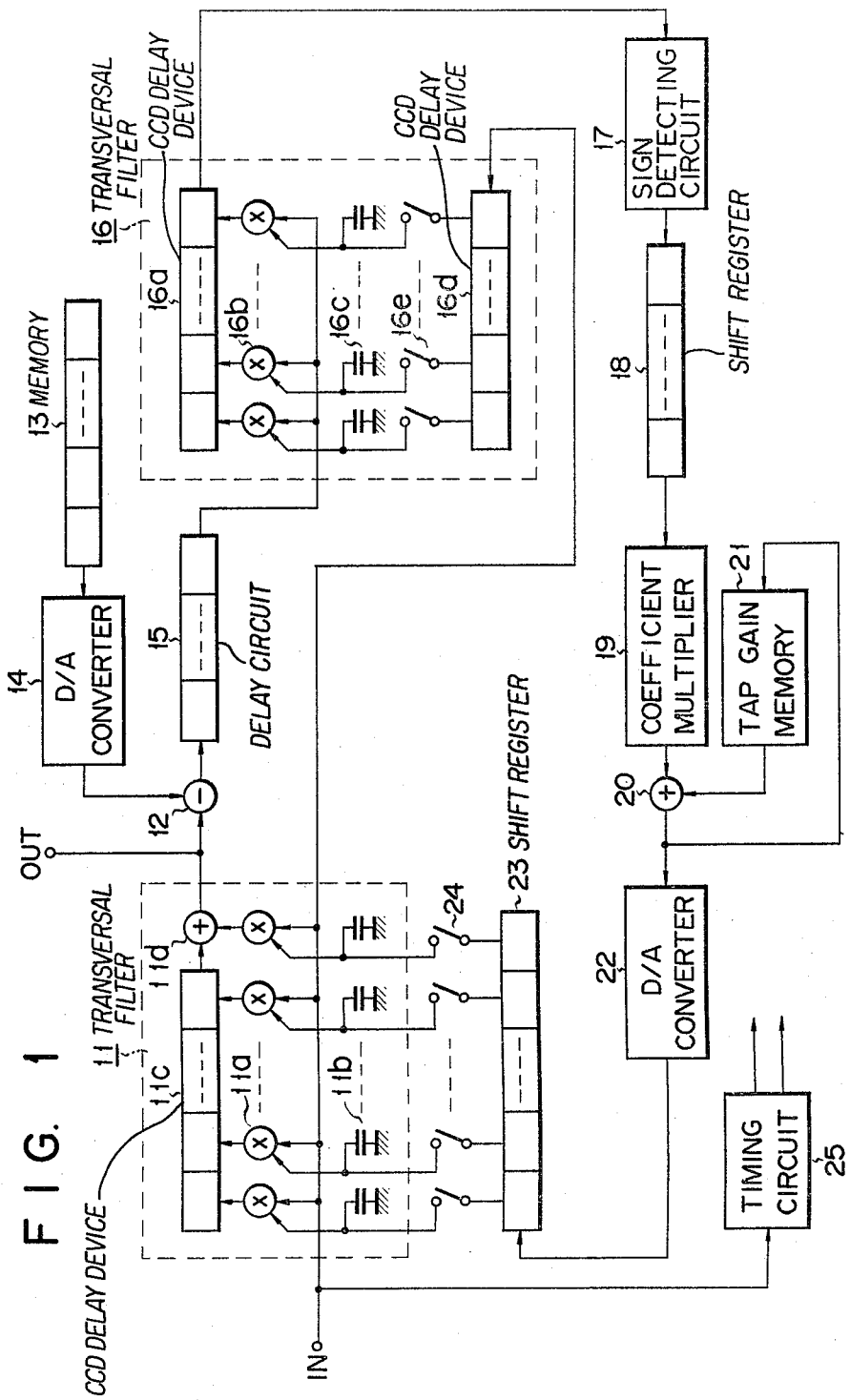
FIG. 1 is a block circuit diagram showing one embodiment of a ghost signal cancelling apparatus according to this invention.

In FIG. 1, a video signal is supplied from an input terminal IN to a transversal filter 11. The transversal filter 11 used may be made of such a filter as disclosed by T. Sakaue, M. Iwasawa and K. Matsushima "An Input-Weighted CCD Transversal Filter" in The 8th Conference on Solid State Devices, Tokyo, Digest of Technical Papers, A-5-7, pp. 137–138, September 1976. The video signal is multiplied by a signal held by a tap gain holding capacitor $11b$, by means of a multiplier $11a$ which functions as a weighting circuit. The output of the multiplier $11a$ is supplied to the corresponding tap of a CCD delay circuit $11c$. The output from the last stage of the CCD delay device $11c$ is supplied to an adder $11d$ and is added thereby to a signal from a multiplier $11a$–$o$, i.e. product of the video signal and a signal held by a tap gain holding capacitor $11b$ connected to the multiplier $11a$–$o$. The output from the adder $11d$ is supplied to an output terminal OUT and one input terminal of a difference circuit 12.

The sampling frequency (or charge transfer speed) of the CCD delay device $11c$ is at least twice the highest frequency of the input video signal which is, for example, 4.5 MHz. Then, in view of the sampling theory, the waveform information of an input video signal can be preserved. In this embodiment, the charge transfer in the CCD delay device $11c$ is controlled with signals of 10.7 MHz, a frequency three times as high as the frequency 3.58 MHz of the color subcarrier. Each of the tap gain holding capacitors $11b$ has a time constant large enough to hold a signal at a substantially constant value for one-field period of the video signal.

The other input terminal of the difference circuit 12 is connected to a D/A converter 14 to receive a reference waveform signal stored in a memory 13 in a digital form. The reference waveform signal is a particular portion of the horizontal scanning line signals of the input video signal during the vertical blanking period. The waveform of the output signal from the transversal filter 11 is compared with the waveform represented by the reference waveform signal. The difference between these waveforms is delivered from the output terminal of the circuit 12 as an error waveform signal. A nonzero portion of the waveform signal suggests that the input video signal contains a ghost signal. To cancel such a ghost signal, the tap gains of the transversal filter 11 are adjusted periodically in the following manner.

The error waveform signal thus obtained is supplied to another transversal filter 16 through a delay circuit 15 which is constituted by a shift register. Like the transversal filter 11, the transversal filter 16 comprises a CCD delay device $16a$ of input-weighted type. The error waveform signal from the delay circuit 15 undergoes tap gain weighting by means of multipliers $16b$. That is, it is multiplied by tap gains held by each of tap gain holding capacitors $16c$. The outputs from the multipliers $16b$ are supplied to the CCD delay device $16a$ and thus are delayed. The tap gains held in the respective tap gain holding capacitors 16c are outputs from the respective taps of a CCD delay device 16d. These tap gains have been obtained in time sequence from a video signal from the input terminal IN and have been supplied to the capacitors 16c via respective switches 16e. The value of each tap gain is maintained substantially constant for a specific period of time during which the error waveform signal undergoes tap gain weighting.

The output of the transversal filter 16 is used in the following manner as a weighting signal for the transversal filter 11. First, it is supplied to a sign detecting circuit 17 so that its polarity is detected, positive or negative. The sign detecting circuit 17 is constituted by an A/D converter which produces one of three outputs, "0", "+1" and "−1". For example, the circuit 17 produces a "0" signal when the absolute value of its input signal is less than a reference value, a "+1" signal when the absolute value of its input signal is more than the reference value and the polarity is positive, and a "−1" signal when the absolute value of its input signal is more than the reference value and the polarity is negative. The output of the sign detecting circuit 17 undergoes timing control by means of a shift register 18 and then is multiplied by a constant of proper value by means of a coefficient multiplier 19, whereby a tap gain adjustment signal is obtained. The tap gain adjustment signal is supplied to an adder 20 and thus added to a tap gain data signal read out from a tap gain memory 21 which stores tap gains corresponding to the taps of the transversal filter 11. In this way, the tap gain adjustment is carried out. The output of the adder 20, i.e. adjusted tap gain signal, is written back into the tap gain memory 21 to renew the data stored in the memory 21. At the same time, the output of the adder 20 is supplied to D/A converter 22 and thus converted into an analog signal. Now in the form of an analog signal, the adjusted tap gain signal is stored into a shift register 23 constituted by a CCD. Each CCD delay element of the shift register 23 is provided with a tap. From the taps the adjusted tap gain signal is supplied through switches 24 to the tap gain holding capacitors 11b of the transversal filter 11. The signal held by each capacitor 11b, i.e. the adjusted tap gain signal, is used as a weighting signal for weighting a video signal supplied to the input terminal IN, by means of the multiplier 11a connected to the capacitor 11b. The output from each multiplier 11a is supplied to the corresponding tap of the CCD delay device 11c.

An input terminal of a timing circuit 25 is connected to the input terminal IN. This circuit 25 is designed to supply such timing signals as control signals and drive signals to the above-mentioned devices and circuits, in response, for example, to the sub-carrier signals contained in the input video signal.

The apparatus of the above-described construction effectively cancel ghost signals in such a manner as will be described below.

Let r(t) denote a reference waveform signal (i.e. a signal having an ideal waveform), a(t) an input video signal corresponding to the reference waveform signal r(t), and $C_0, C_1, C_2, \ldots C_{N-1}$ tap gains of the transversal filter 11 as viewed from the right to the left in FIG. 1. Then, the output signal b(t) from the transversal filter 11 can be expressed as follows:

$$b(t) = \sum_{n=0}^{N-1} c_n a(t - nT) \quad (1)$$

In equation (1), T denotes the shift clock period of the CCD delay device 11c of the transversal filter 11. Here, let $a_k$ and $b_k$ denote the sampled values of a(t) and b(t) at a time point (t+kT), respectively. Then, equation (1) can be rewritten as follows:

$$b_k = \sum_{n=0}^{N-1} c_n a_{k-n} \, (k = 0, 1, 2, \ldots) \quad (2)$$

Thus, the error waveform signal $e_k$, i.e. the difference between the value of the output video signal and the value $r_k$ of the reference waveform signal at the time point (t+kT), can be obtained by the difference circuit 12 as shown in the following equation:

$$e_k = b_k - r_k = \sum_{n=0}^{N-1} c_n a_{k-n} - r_k \quad (3)$$

Suppose the supply of shift clock pulses from the timing circuit 25 to the CCD delay device 16d is stopped at the time point MT, where M denotes the number of stages of the CCD delay device 16d, then, sampled values $a_0, a_1, a_2, \ldots a_{M-1}$ of the input video signal will be stored into the respective stages of the CCD delay device 16d. Values $a_0, a_1, a_2, \ldots a_{M-1}$ are then stored into the capacitors 16c from the left to the right as tap gain values. Each tap gain value is used by the multiplier 16d for weighting the error waveform signal $e_k$ which has been delayed by MT by means of the delay circuit 15. Then output $d_k$ from the transversal filter 16 is expressed as follows:

$$d_k = \sum_{m=0}^{M-1} a_n e_{k+m-2M} \quad (4)$$

Equation 4 can be transformed as follows:

$$d_k = \sum_{m=0}^{M-1} a_n e_{k+m} \quad (5)$$

By the way, the purpose of the apparatus shown in FIG. 1 is to control the tap gain series $[C_i]$ of the transversal filter 11 so that the error $e_k$ is minimized in a certain sense. One of the measures to evaluate the amount of the error $e_k$ is the square sum error E, which is expressed as follows:

$$E = \sum_{k=0}^{\infty} e_k^2 \quad (6)$$

In equation (6), ∞, symbol of infinity, implies that the summation substantially covers one complete horizontal scanning line. The square sum error E is of course a function of the tap gain series $[C_i]$ of the transversal filter 11. Now it will be described how the sum E depends upon each tap gain $C_i$ (i=0, 1, 2, ... N−1). Let E be partially differentiated with respect to $C_i$. Then, $$\frac{\partial E}{\partial C_i} = \sum_{k=0}^{\infty} 2e_k \frac{\partial e_k}{\partial C_i} \quad (7)$$

-continued $$= \sum_{k=0}^{\infty} 2e_k \frac{\partial}{\partial C_i}\left[\sum_{n=0}^{N-1} c_n a_{k-n} - r_k\right]$$

$$= 2\sum_{k=0}^{\infty} a_{k-i} e_k$$

$$= 2\sum_{k=-i}^{\infty} a_k e_{k+i}$$

$$= 2\sum_{k=-i}^{-1} a_k e_{k+i} + 2\sum_{k=0}^{M-1} a_k e_{k+i} + 2\sum_{k=M}^{\infty} a_k e_{k+i}$$

is obtained.

Let the reference waveform $[r_k]$ and the corresponding time origin $t=0$ be so chosen that only those $r_k$'s well within the time period $0 \leq k \leq n-1$ are non-zero, and all $r_k$'s outside of this period are completely zero. The input video signal $[a_k]$ is generally similar to $[r_k]$ except for ghost signal components. Therefore the $a_k$'s outside of the period $0 \leq k \leq n-1$ are comparatively smaller than the $a_k$'s within the period. It means that only the second summation term of the right hand side of equation (7) is predominant and the other two terms can be omitted without giving rise to any significant consequences.

According to the above argument equation (7) can be approximated by the following equation.

$$\frac{\partial E}{\partial C_i} = 2\sum_{m=0}^{M-1} a_m e_{m+i} \qquad (8)$$

Then equations (5) and (8) lead to the equation $$\partial E/\partial C_i = 2d_{i+2n} \qquad (9)$$

where, $i = 0, 1, 2, \ldots, N = 1$.

Equation (9) indicates that, in case the output $d_{i+2M}$ of the transversal filter 16 is positive, the square sum E increases if the tap gain $C_i$ is increased and decreases if the tap gain $C_i$ is reduced. The polarity of the output $d_{i+2M}$, is detected by the sign detecting circuit 17. The output of the sign detecting circuit 17 is subjected to timing control by the shift register 18 and then is supplied to the coefficient multiplier 19. Every time the tap gain adjustment data for each tap gain $C_i$ is delivered from the register 18, the coefficient multiplier 19 multiplies the tap gain adjustment data by a negative coefficient $-\alpha$ ($\alpha$: a positive value). Then, the output of the coefficient multiplier 19, $\Delta C_i$, is expressed as follows:

$$\Delta C_i = \alpha \text{sgn}(d_{i+2M}) \qquad (10)$$

where, sgn denotes the polarity.

The value $\Delta C_i$ is added by the adder 20 to the corresponding tap gain $C_i$ stored in the tap gain memory 21. Thus, $$C_i' = C_i + \Delta C_i \qquad (11)$$

The adjusted tap gain $C_i'$, i.e. output from the adder 20 is written back into the tap gain memory 21, thus renewing the contents thereof. At the same time, the adjusted tap gain $C_i'$ is converted into an analog signal by the D/A converter 22. The analog signal is supplied to the transversal filter 11 via the shift register 23, whereby the input video signal is now weighted with the adjusted tap gains to further reduce the ghost signals in the input video signal. The above mentioned sequence of tap gain control procedures is repeated at regular intervals until the tap gains of the transversal filter 11 come to have the values corresponding to the ghost signals, thus effectively cancelling the ghost signals contained in the input video signal.

The shift register 18 takes in the output from the transversal filter 16 at the speed of 10.7 mHz, and then supplies the output to the adder 20 at the operating speed of the tap gain memory 21. The shift register 18 would not therefore be necessary if the tap gain memory 21 operates at a sufficiently high speed. Generally, however, it is better to use a shift register for speed matching because the structure of the apparatus is simpler and the cost thereof is lower than otherwise.

If the time constant of the tap gain holding capacitors 11b cannot be set large enough with respect to the field period, the tap gain may be written into the capacitors 11b two or more times during each field period.

As described above, the tap gain series $[C_i]$ of the transversal filter 11 is incrementally adjusted one time during one field period, and thus the square sum error E is made gradually smaller. The sum E is reduced, as mentioned above, with respect to the output waveform signal $[b_k]$ corresponding to the reference waveform signal $[r_k]$. Thus, if the shape of the reference waveform signal $[r_k]$ is so selected that its spectrum covers the full video band, then it can be said that the characteristic of the TV transmission path is equalized as to all the frequency components of the video signal band. This means that a ghost component, if any, appearing on all the horizontal scanning lines can be cancelled.

Here it should be noted that, as understood from the description as to how equation (9) is established, no limitation has been imposed on the time relationship between the input video signal $[a_k]$ and the reference waveform signal $[r_k]$, except that the non-zero portion of $[a_k]$ is substantially confined within the time period $0 \leq k \leq n-1$. This means that the input video signal need not have its phase precisely synchronized with that of the reference waveform signal. In other words, a phase matching between the video signal and the reference waveform signal $[r_k]$ is unnecessary when the signal $[r_k]$ is read out from the memory 13. By contrast, in some of the conventional ghost signal cancelling apparatus as, disclosed by E. Armon, "An Adaptive Equalizer for Television Channels", IEEE Trans. COM-17, No. 6, P. 726, Dec. 1969, it is necessary to establish an accurate timing synchronization between the input video signal and the reference waveform signal. In the conventional ghost signal cancelling apparatus an error in phase matching between the input video signal and the reference waveform signal should be kept within a friction of 1 T. The point $t=0$ may need not be strictly set in such an automatic equalizer as disclosed in R. W. Lucky and H. R. Rudin, "An Automatic Equalizer for General Purpose Communication Channels", BSTJ, Vol. 46, No. 9, November 1967, pp. 2179–2208. In such an automatic equalizer, however, there must be provided as many correlators and integrators as the taps of a transversal filter. Thus, such an automatic equalizer would become too costly to be applied to TV sets for household use, since they require transversal filters with many taps if it is required to cancel ghost signals of long delay. In view of this, the ghost signal cancelling apparatus according to this invention can be constituted using less correlators and integrators than does the conventional ones and can therefore be manufactured at a lower cost. Yet it can cancel ghost signals more effectively than the conventional apparatus.

In the above description the square sum error E has been used to evaluate the performance of ghost signal cancelling. Instead, the sum $E_A$ of the absolute values of error waveform $e_k$ may be used. The sum $E_A$ can be represented as follows:

$$E_A = \sum_{k=0}^{\infty} |e_k| \quad (12)$$

Using E, the following equation is obtained which corresponds to equation (8):

$$\frac{\partial E_A}{\partial C_i} = \sum_{m=0}^{M-1} a_m \, sgn \, (e_{m+i}) \quad (13)$$

Thus, by providing a sign detecting circuit after the difference circuit 12 in FIG. 1, the following equation which corresponds to equation (5) is established:

$$d_{k+2M} = \sum_{m=0}^{M-1} a_m \, sgn \, (e_{k+m}) \quad (14)$$

Further, the following equation which corresponds to equation (9) is obtained $$\partial E_A / \partial C_i = d_{i+2M} \quad \ldots (15)$$

From equation (15) it is clear that the apparatus shown in FIG. 1 can be modified by adding a sign detecting circuit after the difference circuit 12 so that $E_A$ is minimized instead of E.

Figure 2:
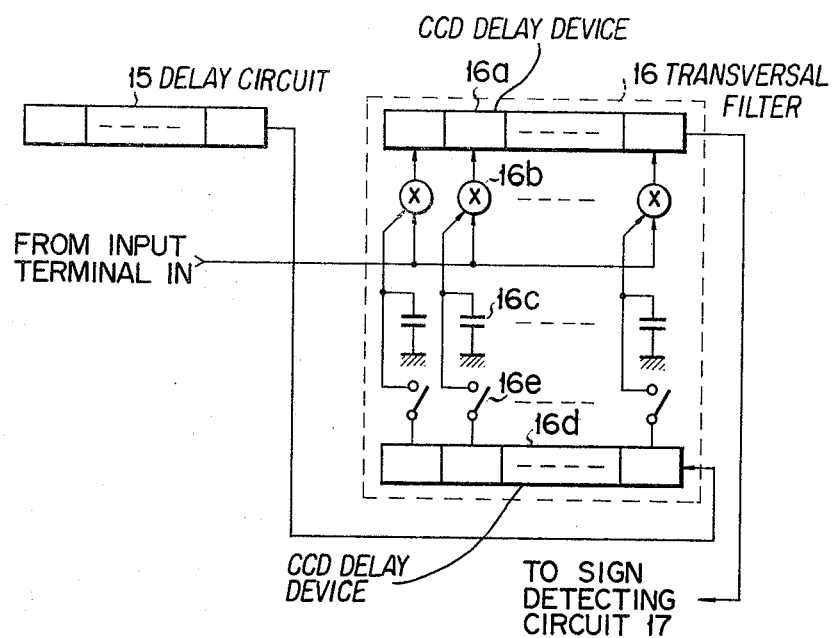
FIG. 2 is a block circuit diagram showing a part of a modification of the apparatus illustrated in FIG. 1.

In the apparatus of FIG. 1 the function of the transversal filter 16 is to compute the cross-correlation between the input video signal $[a_k]$ and the error output $[e_k]$. The function of the transversal filter 16 being as such, the error waveform signal $[e_k]$ from the shift register 15 is supplied to the multipliers 16b, and the input video signal $[a_k]$ is supplied to the CCD delay device 16d. Instead, as shown in FIG. 2, the error waveform signal $[e_k]$ may be supplied to the CCD delay device 16d as tap gains of the transversal filter 16, and the input video signal $[a_k9$ may be supplied to the multipliers 16b so as to be weighted with the error waveform $[e_k]$. In this case, however, the transversal filter 16 must have taps the number of which corresponds to the length of the error waveform signal $[e_k]$. Hence, the apparatus should be provided with a longer CCD delay device having stages the number of which equals N+M, sum of the number N of taps of the transversal filter 11 and the length M of the main signal component of the input video signal.

In the embodiment of FIGS. 1 and 2, input-weighted type of transversal filters are utilized for transversal filters 11 and 16. However, conventional output-weighted type of transversal filters are equally applicable.

Figure 4:
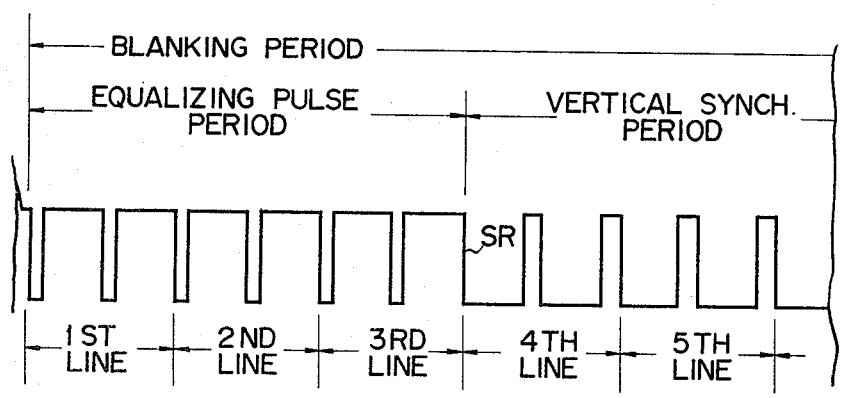
FIG. 4 shows the waveform of a portion of a video signal.

Inexpensive and simple in structure, the ghost signal cancelling apparatus according to this invention can be applied to TV sets for household use. The apparatus may have such a structure as illustrated in FIG. 3, wherein similar or like devices are denoted by similar or like reference numerals as used in FIGS. 1 and 2. The reference waveform signal used in this apparatus is the derivative of the step waveform signal $S_R$ which appears, as shown in FIG. 4, when an equalizing pulse period ends and a vertical synchronization period starts—that is, between the third horizontal scanning period and the fourth horizontal scanning period of every vertical blanking period. Thus, the level of the reference waveform signal $[r_k]$ becomes zero when k increases to some extent. The period during which the signal $[r_k]$ is not zero would be extremely short since the signal $[r_k]$ is an impulse. In this case, the non-zero period of the signal $[r_k]$ affects the output $d_{i+2M}$ of the transversal filter 16, which is defined by equation (9), only when i is small. Thus, so far as a tap gain $C_i$ where i is somewhat large is concerned, it would not be a matter of practicality if the reference waveform signal $[r_k]$ is processed as an all zero-level signal.

The apparatus shown in FIG. 3 differs from the embodiment of FIG. 1 in that it is provided with two differentiating circuits 26 and 27, but not with such a memory and an A/D converter as used in the embodiment of FIG. 1 for storing and converting the reference waveform signal $[r_k]$. The differentiating circuit 26 is to obtain the difference between the output from the transversal filter 11 and the same output delayed by one clock period. The circuit 26 is constituted by a difference circuit 26a and a one clock period delay circuit 26b and produces the difference between two immediately adjacent samples of the signal from the transversal filter 11. The output signal of the differentiating circuit 26 is supplied via a shift register 15 to a transversal filter 16. In the meantime, the input video signal is supplied as a tap gain sequence to the transversal filter 16 through the differentating circuit 27. Like the circuit 26, the differentiating circuit 27 is constituted by a difference circuit 27a and a one clock period delay circuit 27b and produces the difference between two immediately adjacent samples of the input video signal. Both differentiating circuits 26 and 27 produce an output in the form of an impulse from a step waveform $S_R$ appearing between the third and fourth horizontal scanning periods as shown in FIG. 4.

In the apparatus of FIG. 3, the tap gain $c_i$ would have an erroneous value when i is small. To avoid this, the value of the tap gain $c_i$ is fixed and thus made exempt from any control for small i's. More specifically, the tap gains of the tap gain series $[c_i]$ are given specific values, for example, $c_0=1$, $c_2=c_3=\ldots c_{10}=0$. In this way the reference waveform signal $[r_k]$ can be considered zero through out the period $0 \leq k \leq N$. This is why the apparatus need not be provided with such a memory and an A/D converter as used in the embodiment of FIG. 1 for storing and converting the reference waveform signal $[r_k]$.

Further, in the apparatus of FIG. 3 a tap gain read out from a tap gain memory 21 is applied to the corresponding tap gain holding capacitor 11b of the transversal filter 11 through a corresponding switch 24. The switches 24 are rendered conductive one after another by a shift register 28 which is driven by a timing circuit 25. These switches 24 are identical in function with the switches 24 used in the apparatus of FIG. 1, which simultaneously supply tap gain values to multipliers 11a of the transversal filter 11.

Without a memory for storing the reference waveform $[r_k]$, the apparatus shown in FIG. 3 is simpler in construction than that shown in FIG. 1. In addition, it is not required to start the tap gain adjustment at a fixed point in each field, as required in the case of FIG. 1. Thus, a jitter, if any at the tap gain adjustment start point, would not cause the apparatus any trouble. For this reason the construction of the timing circuit 25 in FIG. 3 is simpler compared with the one in FIG. 1.

Figure 5:
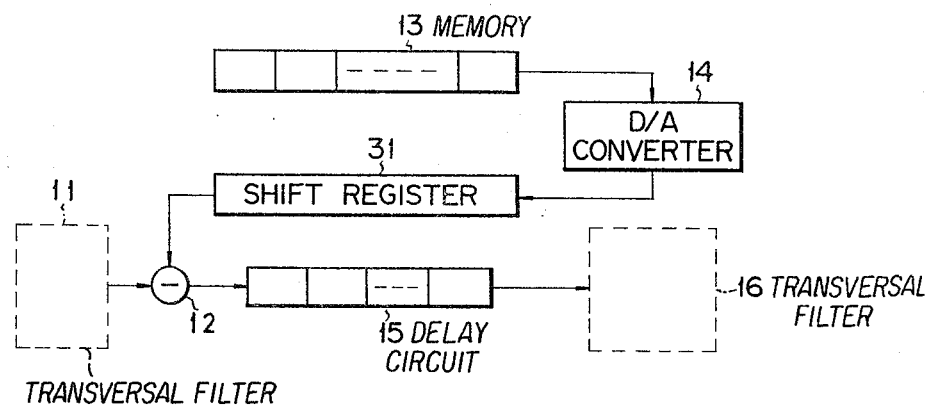
FIGS. 5 and 6 are block circuit diagrams respectively showing the part of the modification of the apparatus shown in FIG. 1 and a part of a modification of the apparatus shown in FIG. 3.

This invention is not limited to the above-described embodiments. For example, the apparatus of FIG. 1 may be further provided with a CCD shift register 31 as shown in FIG. 5. The shift register 31 temporarily stores the reference waveform signal read out from a memory 13 via a D/A converter 14. In this case, the signal can be read out from the memory 13 at a low speed determined in accordance with the speed of the D/A converter 14, and the signal is read out from the CCD shift register 31 at the speed of the shift clock of the transversal filter 11. Assisted by the CCD shift register 31, the D/A converter 14 need not fulfil the high speed requirements that the D/A converter 14 must satisfy in the apparatus shown in FIG. 1, and the apparatus can be manufactured at a lower cost than the apparatus shown in FIG. 1. Further, instead of the memory 13 and the D/A converter 14, use may be made of potentiometers which hold the reference waveform signal in the form of analog voltages and supplies these analog voltages to a difference circuit 12 whenever necessary.

Figure 6:
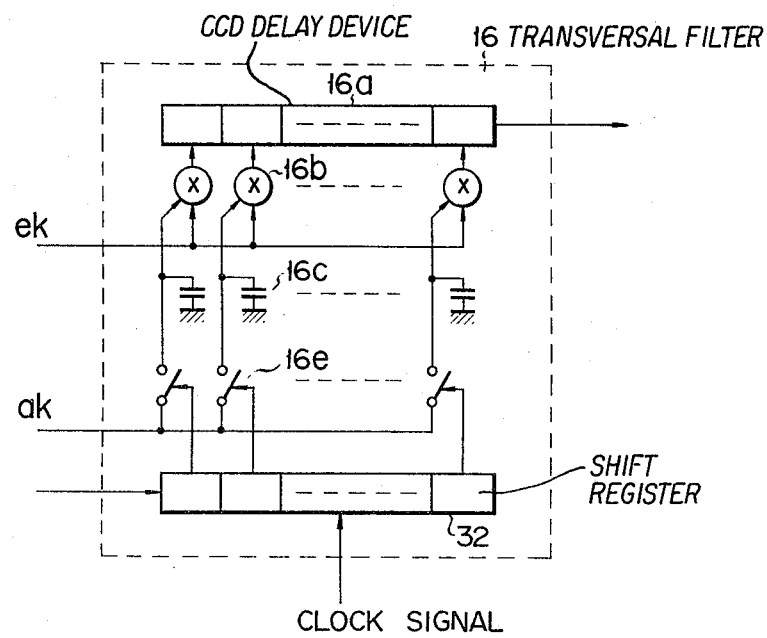

Moreover, the transversal filter 16 may be constructed as illustrated in FIG. 6. As shown in FIG. 6, the filter 16 is provided with a shift register 32 which starts shifting a "1" signal at the tap gain adjustment start point t(32 0). The output signal of the shift register 32 closes switches 16e one by one, which supplies the input video signal [$a_k$] as tap gains to multipliers 16b.

Figure 7:
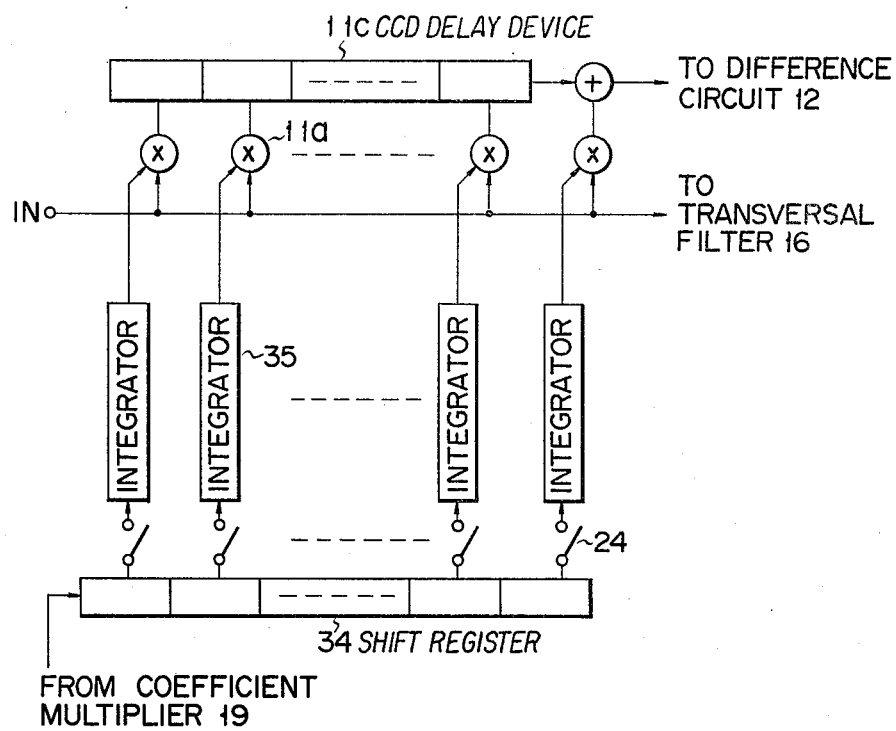
FIG. 7 is a block circuit diagram showing a part of another modification of the apparatus shown in FIG. 1.

Further, instead of the digital tap gain memory 21 and the tap gain holding capacitors 11b, an analog shift register 34 and integrators 35 may be used as illustrated in FIG. 7. In this case, the tap gain adjustment data from the coefficient multiplier 19 is supplied to the integrators 35 via switches 24. The integrators 35 perform the function of the adder 20 and the tap gain memory 21 shown in FIGS. 1 and 3.

Figure 8:
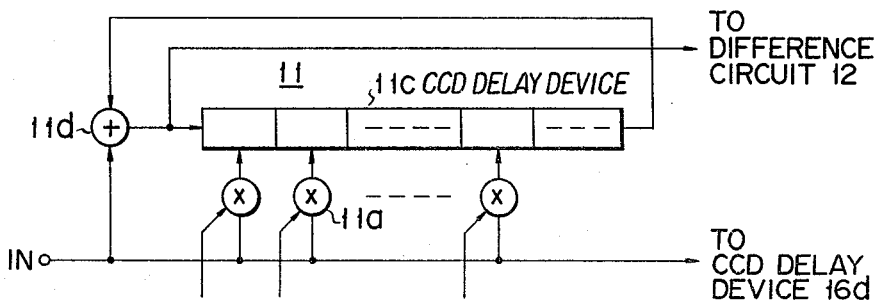
FIG. 8 is a block circuit diagram showing a part of a further embodiment of this invention.

In the embodiments of FIGS. 1 and 3, the filter 11 is a feed-forward circuit having a non-recursive configuration. The input video signal and the output of the CCD delay circuit 11c are added together by the adder 11d. With this construction, the system would never oscillate however large is the ghost component contained in the input video signal so long as the ghost component is smaller than the main signal component, and the apparatus operates stably. Instead, the filter 11 may be constituted by a feedback circuit having a recursive configuration as shown in FIG. 8. This type of a configuration is very attractive because no so-called "secondary ghost" is newly generated as is in the feed-forward configuration. More specifically, as illustrated in FIG. 8, an input terminal IN is connected to one input terminal of an adder 11d, and the other input terminal of the adder 11d is connected to the output of a CCD delay device 11c. The output terminal of the adder 11d is connected to the input of the CCD delay device 11c and to a difference circuit 12. A video signal supplied to the input terminal IN is at the same time supplied to the input terminal of a CCD delay device 16d of a transversal filter 16 which is constructionally identical with the transversal filter 16 shown in FIG. 1 or FIG. 3. Such a recursive filter 11 as shown in FIG. 8 operates basically in the same manner as does the transversal filter 11 shown in FIG. 1 or FIG. 3.

What is claimed is:

1. A ghost signal cancelling apparatus comprising means for applying an input video signal to a filter circuit including a first tranversal filter having a first set of weighting circuits for applying a first weighting signal to said filter circuit, means for supplying an output signal from the filter circuit to a second transversal filter having a second set of weighting circuits for applying a second weighting signal to said second transversal filter, means for determining coefficients of the second set of weighting circuits according to the input video signal, and means for producing coefficients of the first set of weighting circuits from an output signal of the second transversal filter.

2. A ghost signal cancelling apparatus according to claim 1, wherein said second transversal filter is a charge transfer type filter and includes means for dividing the output signal which inputs said second transversal filter into a plurality of signals, means for multiplying each of said plurality of signals by each of a set of coefficients, and means for supplying the multiplied signals to a plurality of input terminals of said charge transfer filter.

3. A ghost signal cancelling apparatus according to claim 1, wherein said second transversal filter carries out a convolutional operation by dividing the output signal from the filter circuit including the first transversal filter into a plurality of signals by means of a signal distribution circuit, multiplying the divided signals by time-series signals based on the input video signal by means of a plurality of multiplier circuits, and adding output signals from the multiplier circuits by means of a delay device with a plurality of input terminals.

4. A ghost signal cancelling apparatus according to claim 1, wherein said means for supplying the output signal of the filter circuit to the second transversal filter is comprised of means for generating a predetermined reference signal, and subtracting means having two inputs and an output; a first of said two inputs being connected to the output of the filter circuit, a second of said two inputs being connected to the means for generating a predetermined reference signal, and said output being connected to the input of the second transversal filter.

5. A ghost signal cancelling apparatus according to claim 1, wherein first and second differentiating circuits are further provided; the output signal of the filter circuit being supplied to the second transversal filter through the first differentiating circuit, and the input video signal being supplied to the means for determining the coefficients of the second set of weighting circuits through the second differentiating circuit.

6. A ghost signal cancelling apparatus comprising means for applying an input video signal to a filter circuit including a first transversal filter having a first set of weighting circuits connected to an input side thereof, means for supplying the input video signal to a second transversal filter having a second set of weighting circuits connected to an input side thereof, means for determining weighting coefficients of the second set of weighting circuits according to an output signal of the filter circuit, and means for determining weighting coefficients of the first set of weighting circuits from an output signal of the second transversal filter.

7. A ghost signal cancelling apparatus according to claim 6, wherein said second transversal filter is a charge transfer type filter which includes means for dividing the input video signal into a plurality of signals, means for multiplying each of said plurality of signals by each of a set of weighting coefficients of the second set of weighting circuits, and means for supplying the multiplied signals to a plurality of input terminals of said charge transfer filter.

8. A ghost signal cancelling apparatus according to claim 6, wherein said second transversal filter carries out a convolutional operation by dividing the input video signal into a plurality of time series signals by means of a signal distribution circuit, multiplying the plurality of time series signals by outputted time series signals from the filter circuit by means of a plurality of multiplier circuits, and adding output signals from the multiplier circuits by means of a delay device with a plurality of input terminals.

9. A ghost signal cancelling apparatus according to claim 6, wherein said means for determining the coefficients of the set of weighting circuits of the second transversal filter is comprised of means for generating a predetermined reference signal, and subtracting means having two inputs and an output; a first of said two inputs being connected to the output of the filter circuit including the first transversal filter, a second of said two inputs being connected to the means for generating a predetermined reference signal, and said output of the subtracting means being connected to means for setting the coefficients of the weighting circuits of the second transversal filter in accordance with the signal waveform of said output.

10. A ghost signal cancelling apparatus according to claim 6, wherein first and second differentiating circuits are further provided; the output signal of the filter circuit being supplied to the means for determining the weighting coefficients of the second set of weighting circuits through the first differentiating circuit, and the input video signal being supplied to the second transversal filter through the second differentiating circuit.

11. A ghost signal cancelling apparatus according to claim 1 or 6, wherein said filter circuit including the first transversal filter is a feed-forward circuit having a non-recursive configuration.

12. A ghost signal cancelling apparatus according to claim 1 or 6, wherein said filter circuit including the first transversal filter is a feedback circuit having a recursive configuration.

13. A ghost signal cancelling apparatus according to claim 1 or 6, wherein said first transversal filter is a charge transfer type filter and includes means for dividing the input video signal into a plurality of signals, means for multiplying each of said plurality of signals by each of a set of coefficients, and means for supplying the multiplied signals to a plurality of input terminals of said charge transfer filter.

14. A ghost signal cancelling apparatus according to claim 1 or 6, wherein the output signal of said second transversal filter is converted to a two-level signal by means of a polarity detecting circuit; said two-level signal being multiplied by a predetermined coefficient by means of a coefficient multiplier, said multiplied two-level signal being used for changing tap gains stored in a tap gain memory; output signals from the tap gain memory being converted into analog signals by a digital-analog converter, stored into an analog shift register, and read out from the analog shift register by means of parallel transfer switches as parallel analog signals to be supplied to the first set of weighting circuits of the first transversal filter.

15. A ghost signal cancelling apparatus according to claim 1 or 6, wherein the output signal of said second transversal filter is converted to a two-level signal by means of a polarity detecting circuit; said two-level signal being multiplied by a predetermined coefficient by means of a coefficient multiplier, said multiplied two-level signal being used for changing tap gains stored in a tap gain memory; output signals from the tap gain memory being converted into analog signals by a digital-analog converter, and supplied sequentially to the first set of weighting circuits of the first transversal filter by means of parallel transfer switches.

16. A ghost signal cancelling apparatus comprising means for applying an input video signal (a(t)) to a filter circuit including a first transversal filter having a charge transfer delay device and a first set of weighting circuits coupled to said charge transfer delay device, said first transversal filter defining a transfer function b(t), wherein $$b(t) = \sum_{n=0}^{N-1} C_n a(t - nT)$$

where n and N are integers, $C_n$ are tap gains of the transversal filter and T is the shift clock period of the charge transfer delay device, means for supplying the input video signal to a second transversal filter having a second set of weighting circuits coupled thereto, means for determining weighting coefficients of the second set of weighting circuits according to an output signal of the filter circuit, and means for determining weighting coefficients of the first set of weighting circuits from an output signal of the second transversal filter.

* * * * *